(12) United States Patent
Bogert et al.

(10) Patent No.: US 8,833,733 B2
(45) Date of Patent: Sep. 16, 2014

(54) VALVE CONNECTIONS

(75) Inventors: Roy B. Bogert, Lincoln Park, NJ (US);
Christopher Ganci, Rockaway, NJ (US)

(73) Assignee: Automatic Switch Company, Florham Park, NJ (US)

( * ) Notice: Subject to any disclaimer, the term of this patent is extended or adjusted under 35 U.S.C. 154(b) by 838 days.

(21) Appl. No.: 13/004,212

(22) Filed: Jan. 11, 2011

(65) Prior Publication Data

US 2011/0175348 A1  Jul. 21, 2011

Related U.S. Application Data

(60) Provisional application No. 61/297,226, filed on Jan. 21, 2010.

(51) Int. Cl.
*F16L 29/00* (2006.01)
*F16L 19/10* (2006.01)

(52) U.S. Cl.
CPC ..................... *F16L 19/10* (2013.01)
USPC ............... 251/148; 285/313; 285/340

(58) Field of Classification Search
USPC ............. 251/148, 150; 285/313, 340, 248, 12
See application file for complete search history.

(56) References Cited

U.S. PATENT DOCUMENTS

| | | | | |
|---|---|---|---|---|
| 3,365,219 | A | * | 1/1968 | Nicolaus ............... 285/340 |
| 3,429,596 | A | * | 2/1969 | Marshall ............... 285/340 |
| 3,545,794 | A | * | 12/1970 | Wise et al. ............ 285/248 |
| 3,653,689 | A | | 4/1972 | Sapy et al. |
| 4,007,951 | A | | 2/1977 | Legris |
| 4,303,263 | A | | 12/1981 | Legris |
| 4,564,223 | A | | 1/1986 | Burrington |
| 4,588,214 | A | | 5/1986 | Guest |
| 4,722,557 | A | | 2/1988 | Bormioli |
| 4,903,995 | A | | 2/1990 | Blenkush et al. |
| 4,911,406 | A | | 3/1990 | Attwood |
| 4,923,220 | A | | 5/1990 | Guest et al. |
| 4,946,200 | A | | 8/1990 | Blenkush et al. |
| 5,039,141 | A | | 8/1991 | Badoureaux |
| 5,085,472 | A | | 2/1992 | Guest |

(Continued)

FOREIGN PATENT DOCUMENTS

| | | |
|---|---|---|
| EP | 1258666 | 11/2002 |
| FR | 2009483 | 2/1970 |
| GB | 1229675 | 4/1971 |
| WO | 2009003015 | 12/2008 |

OTHER PUBLICATIONS

Durrenberger, X., International Search Report for International Patent Application No. PCT/US2011/020946, European Patent Office, dated Mar. 24, 2011.

(Continued)

*Primary Examiner* — John Bastianelli
*Assistant Examiner* — Andrew J Rost
(74) *Attorney, Agent, or Firm* — Locke Lord LLP

(57) ABSTRACT

A valve assembly having a valve body; at least one port to receive tubing; and a collar group to secure the tubing to the port, wherein the collar group is selected from a first collar group configured to secure the tubing by a flattening a washer, thereby driving teeth of the washer into the tubing, and a second collar group having a smooth interior surface to which the tubing is bonded, wherein either the first or the second collar groups may be interchangeably threaded onto the port.

12 Claims, 8 Drawing Sheets

(56) References Cited

U.S. PATENT DOCUMENTS

| | | | |
|---|---|---|---|
| 5,160,179 A * | 11/1992 | Takagi | 285/340 |
| 5,174,611 A | 12/1992 | Byrd et al. | |
| 5,193,856 A * | 3/1993 | Suzuki | 285/300 |
| 5,230,539 A | 7/1993 | Olson | |
| 5,292,157 A * | 3/1994 | Rubichon | 285/39 |
| 5,353,836 A | 10/1994 | deCler et al. | |
| 5,368,339 A | 11/1994 | Serot | |
| 5,403,043 A | 4/1995 | Smet | |
| 5,429,394 A | 7/1995 | Olson | |
| 5,445,358 A | 8/1995 | Anderson | |
| 5,445,395 A | 8/1995 | Combot-Courrau et al. | |
| 5,487,572 A | 1/1996 | Combot-Courrau et al. | |
| 5,511,830 A | 4/1996 | Olson et al. | |
| 5,553,901 A * | 9/1996 | Serot | 285/340 |
| 5,630,570 A | 5/1997 | Lacroix et al. | |
| 5,636,662 A | 6/1997 | Olson | |
| 5,639,064 A | 6/1997 | deCler et al. | |
| 5,655,750 A * | 8/1997 | Smock et al. | 251/148 |
| 5,879,030 A | 3/1999 | Clayson et al. | |
| 5,895,078 A | 4/1999 | Le Clinche | |
| 5,911,443 A | 6/1999 | Le Quere | |
| 5,921,588 A | 7/1999 | Vogel et al. | |
| 5,988,690 A | 11/1999 | Bogard | |
| 6,029,546 A | 2/2000 | Gibson et al. | |
| 6,053,537 A | 4/2000 | Guest | |
| 6,145,887 A | 11/2000 | Cambot-Courrau | |
| 6,206,435 B1 | 3/2001 | Le Clinche | |
| 6,464,266 B1 | 10/2002 | O'Neill et al. | |
| 6,499,772 B1 | 12/2002 | Minemyer | |
| 6,517,115 B1 | 2/2003 | Blivet | |
| 6,588,805 B2 | 7/2003 | Persohn et al. | |
| 6,679,528 B1 | 1/2004 | Poder | |
| 6,764,106 B1 | 7/2004 | Smith et al. | |
| 6,769,721 B2 | 8/2004 | Guest | |
| 6,851,726 B2 | 2/2005 | Minemyer | |
| 6,860,523 B2 | 3/2005 | O'Neill et al. | |
| 6,863,314 B2 | 3/2005 | Guest | |
| 6,880,865 B2 | 4/2005 | Guest | |
| 6,908,120 B2 * | 6/2005 | Tomita et al. | 285/306 |
| RE38,786 E | 8/2005 | Guest | |
| 6,929,289 B1 | 8/2005 | Guest | |
| 6,957,833 B2 | 10/2005 | Guest | |
| 6,964,436 B2 | 11/2005 | Le Quere | |
| 7,011,342 B2 | 3/2006 | Guivarc'h et al. | |
| 7,014,218 B2 | 3/2006 | Fisher et al. | |
| 7,032,932 B2 | 4/2006 | Guest | |
| 7,100,948 B2 | 9/2006 | Guest | |
| 7,192,062 B2 | 3/2007 | Densel et al. | |
| 7,232,159 B2 | 6/2007 | O'Neill et al. | |
| 7,273,235 B2 | 9/2007 | Coquard et al. | |
| 7,455,330 B2 * | 11/2008 | Baumgartner | 285/340 |
| 7,530,606 B1 * | 5/2009 | Yang | 285/340 |
| 8,322,755 B2 * | 12/2012 | Kluss et al. | 285/340 |
| 2003/0116960 A1 | 6/2003 | Yates | |
| 2005/0104367 A1 | 5/2005 | Le Quere | |
| 2006/0232067 A1 * | 10/2006 | Kwak | 285/354 |
| 2007/0194568 A1 | 8/2007 | Guest | |

OTHER PUBLICATIONS

Durrenberger, X., Written Opinion for International Patent Application No. PCT/US2011/020946, European Patent Office, dated Mar. 24, 2011.

* cited by examiner

VALVE CONNECTIONS

CROSS REFERENCE TO RELATED APPLICATIONS

This application claims priority benefit of U.S. patent application Ser. No. 61/297,226, entitled "Valve Connections" and filed Jan. 21, 2010, which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to pneumatic and hydraulic control valves; and more specifically relate to tubing connections for such valves.

2. Description of the Related Art

U.S. Pat. No. 3,653,689 discloses a "releasable coupling for a fluid-carrying tube comprises a socket having four stepped concentric bores, a collar having a conical surface being retained in the first bore. Mounted for axial movement within the collar is a clamping member having a plurality of flexible jaws. The clamping member has an inclined surface co-operating with the conical surface on the collar to force the jaws inwardly to clamp a tube received in the socket. A packing ring is retained in the second bore, and the third and fourth bores serve to locate the tube."

U.S. Pat. No. 4,007,951 discloses a "multipled fluid line connector for hydraulic conduit comprising two cooperating sockets and fixing means for attaching said sockets to one another. Each socket is provided with a grid plate having a plurality of orifices in which are fixed connecting members for receiving the conduits to be connected together, corresponding connecting members of each socket being interconnected. The diameters of the connecting members and associated orifices may be various sizes to accommodate conduits of different diameters."

U.S. Pat. No. 4,303,263 discloses "[i]nstant fittings for reinforced multilayer flexible tubings for fluids, comprising a body internally provided with a cylindrical inlet whose diameter is substantially equal to that of the tubing, a bead extending radially inwardly and constituting a gripping ridge followed by a generally conical part, a bore whose diameter is equal to the large diameter of the cone, said conical part being internally provided with a channelled bush on which is engaged the end of the tubing 8. The invention is applied to the connection of multilayer pipes."

U.S. Pat. No. 4,564,223 discloses a "permanently attachable coupling for high pressure multiple layer wire reinforced hydraulic hose in which the grip on the hose is achieved by the penetration of plural gripping teeth through the cover of the hose directly into engagement with the wire reinforcement. The coupling includes an overlapped shell arrangement in the region of at least one gripping tooth to provide a deeper penetration of that tooth into the reinforcement structure when the shell is crimped into engagement with the hose. The nipple structure of the coupling includes an annular gripping ridge in the region of the overlap which produces a pincer-like grip upon the hose."

U.S. Pat. No. 4,588,214 discloses "a coupling formed of two components, one of which has a body portion with a bore having a taper to give a decreasing diameter towards an entry end of the bore, a collet having resilient arms being located in the bore and the second component having a tube adapted for insertion into said collet through the entry end to be gripped thereby, the tapered bore causing the grip to be tightened if the second component is pulled in the outward direction from the bore in the first component, in order to prevent separation of the components after assembly, the collet has a portion protruding out of the first component through said entry end of the bore and the second component has a portion extending around the protruding end of the collet and the two components having surfaces which abut to prevent the collet being pressed inwardly into the bore in the first component by moving the two components towards one another."

U.S. Pat. No. 4,722,557 discloses a "quick connection device has a supporting structure for connection elements constrained to the union body by means of radial engagement members engaged in a movable manner with a substantially spherical reaction surface of the union body. In this manner any coplanarity defect or difference in thickness of the end flange of the pipe to be connected is compensated for through appropriate rotation of the supporting structure of the quick connection device along said spherical surface."

U.S. Pat. No. 4,903,995 discloses a "self-tightening fitting and fitting connector for use with soft tubing includes a stem having a flange at one end over which a piece of soft tubing may be pulled, and a sleeve which is slidable over the stem and has an inwardly extending lip with a contact surface thereon. A releasable ratchet mechanism prevents movement of the sleeve away from the flange, so that tubing can be secured tightly between the contact surface of the sleeve and the flange. When tension is applied to the tubing, the lip portion catches on the tubing, urging the contact surface tighter against the flange, preventing the tubing from creeping through the clamping couple formed by the sleeve and flange. When it is desired to disconnect the tubing, the ratchet mechanism can be released. The method of use is also disclosed."

U.S. Pat. No. 4,911,406 discloses a "quick connect coupling for fluid conduits having an outer cylindrical member and an inner conduit fitted within the outer cylindrical member including a continuous circular gripper ring seated in the outer cylindrical member and having radially inward gripper teeth bent axially forward toward the outer cylindrical member in a generally conical plane, each tooth has a twist in a common direction whereby the inner conduit can be slid into the gripper ring but removed from the gripper ring only by unscrewing from the gripper ring."

U.S. Pat. No. 4,923,220 discloses "a tube coupling (10) for a tube (11) having a body (12) with open ended throughway (13) to receive the tube and a collet (21) in the open end of the throughway having resilient arms (23) engaging a tapered cam surface (20) in the body to clamp the ends of the arms against a tube extending through the collet into the body to lock a tube in the body. The body has a cylindrical outer surface and a cylindrical cover (30) encircles and is slidable along the body. One end of the cover has an end wall (32) extending across the end of the body opposite the open end of the throughway with an aperture (33) through which the tube extends. The other end of the cover has an internal annular projection (35) which snaps over the end of the cylindrical body to retain the cover on the body while permitting the cover to slide linearly along the body. The end wall of the cover is engagable with the collet where it projects from the open end of the throughway and by pressing the end wall of the cover towards the end of the coupling body, the collet is depressed into the body to hold the resilient arms away from the tapered cam surface in the coupling body and permit the tube (11) to be withdrawn. The arrangement is particularly useful for relatively small couplings utilized in confined spaces where manual depression of the projecting part of the collet from the end of the coupling body would be difficult."

U.S. Pat. No. 4,946,200 discloses a "self-tightening fitting and fitting connector for use with soft tubing includes a stem having a flange at one end over which a piece of soft tubing may be pulled, and a sleeve which is slidable over the stem and has an inwardly extending lip with a connect surface thereon."

U.S. Pat. No. 5,039,141 discloses a "catch, which may be used either with rapid connections which can be uncoupled, and those which can not, is of the type which consists of an annular part (2), of spring steel, having teeth (4), directed radially inward, and of which the free edges (4a) are inscribed in a circle (5) of diameter (D.sub.1), greater than the outer diameter (D.sub.2) of the tube (6) for which the rapid connection equipped with this catch is intended. Each tooth (4) has a free edge (4a) in a circle arc of radius (R) less than that of the circle (5) in which this free edge (4a) is inscribed."

U.S. Pat. No. 5,085,472 discloses "a tube coupling sleeve having a throughway open at one end to receive an end part of a tube to be coupled therein. The sleeve has an end stop spaced from the open end to define the limit of insertion of the tube in the sleeve and an inner integral hollow spigot extends along the sleeve from the end stop through the open end of the sleeve to project into the tube. The outer surface of the spigot has annular ridges or ribs to grip the inner surface of the tube and hold it in place. The closed and of the sleeve has an encircling head to fit in a bore in a body and the head has an encircling steel star washer to lock the head in the bore."

U.S. Pat. No. 5,174,611 discloses a "releasable coupling for a tube is disclosed. The coupling contains a socket with at least four stepped bores. Located within the first bore is a compression means (such as a collar) which has an inner surface inclined to the axis of first bore. A collet is mounted within the compression means and is so configured that, when the collet is caused to move inwardly, the inclined surface of the compression means causes the jaws of the collet to move inwardly. The coupling also contains a tube support located within the second bore. At least four sealing means are disposed within the third bore: a first O-ring is contiguous with a first washer, which in turn is contiguous with a second O-ring, which in turn is contiguous with a second washer."

U.S. Pat. No. 5,230,539 discloses a "quick connect coupling for connecting a tube to a body having a stepped bore formed therethrough. The coupling includes a sleeve which is press fit in the bore. The inner surface of the sleeve has a cylindrical portion, a radially outwardly extending frusto-conical portion, and an internal shoulder defined therebetween. A collet is disposed within the sleeve having a boss portion which is slightly smaller than the inner diameter of the cylindrical portion of the sleeve. The boss portion supports and guides the collet for co-axial movement relative to the sleeve. The collet further includes an enlarged end portion having an external shoulder and a frusto-conical surface. The frusto-conical collet surface is disposed within the frusto-conical sleeve surface. The tube is inserted within the coupling within the collet. When it is attempted to move the tube out of the body, the frusto-conical collet surface engages the frusto-conical sleeve surface. Also, the external collet shoulder engages the internal sleeve shoulder. As a result, the collet (and the tube engaged thereby) are positively retained within the coupling and the body."

U.S. Pat. No. 5,353,836 discloses a "valve assembly includes a receptor valve assembly and an insert valve assembly each defining a normally closed fluid passage. The insert and receptor valve assemblies each include a valve activation structure engageable with one another and having corresponding helical grooves and splines for opening the receptor and insert valve assemblies upon engagement of the valve activation structures and rotation of the insert valve assembly relative to the receptor valve assembly wherein their respective fluid passages are interconnected. The insert and receptor valve assemblies are configured to provide substantially no fluid passage therebetween when closed, thereby providing little or no spillage of fluid when disconnecting the insert and receptor valve assemblies."

U.S. Pat. No. 5,368,339 discloses a "network for distributing a fluid under pressure. The network has a substantially horizontal main pipe situated at an upper level, with horizontal or vertical secondary pipes branching therefrom. The junction between the main pipe and a secondary pipe is provided by a branch clamp having a zone for covering at least one orifice formed in the top half-cylinder of the wall of the main pipe, into which zone there opens out a first end of a branch duct internal to the clamp, the other end of the duct being fitted with a coupling for coupling the clamp to the secondary pipe. The axis of the first end of the branch duct and the axis of the coupling form an angle a which is obtuse when measured between the axes in the flow direction of fluid flowing along the branch duct."

U.S. Pat. No. 5,403,043 discloses a "pipe coupling having mating pin and socket elements, each having pitched interlocking fins. The two elements are mated by slidingly engaging the two elements and then rotating them. An O-ring may be added to one or the other of the elements to create a more leak-tight seal between the two elements. Additionally, the pin and socket elements may each have saw tooth shaped teeth which interact as a locking means for the pipe coupling."

U.S. Pat. No. 5,429,394 discloses an "assembly includes a quick connect cartridge which is inserted into a port of a valve or manifold in a pneumatic system for coupling external fluid lines of the system to the valve or manifold. The components of the quick connect cartridge and the O-ring seal are mounted on the tubular shank of a plug. The plug is used as a shipping pin and is also used to install the components into a port of the valve or manifold. Normally, the plug is withdrawn from the port after the components are inserted in the port. If it is desired to keep the port closed after initial installation of the components, the plug may be retained in the port until it is time to connect the port. If it is desired to leave the port permanently closed, the plug remains in place. The plug can be an open plug allowing testing of the valve in which case a dust plug is provided for shipping purposes."

U.S. Pat. No. 5,445,358 discloses a "push-to-connect type coupler has an intermediate venting position for the nipple. The coupler includes a coupler socket having an inner sleeve, an intermediate coupler body, and an outer sleeve formed from tubular or cylindrical components which are axially movable with respect to one another. A valve member is disposed axially within the coupler and is normally biased into a closed position. The inner sleeve of the coupler is spring-biased toward the opening of the coupler, and includes an inner set of captive coupling balls. The coupler body also has an outer set of captive coupling balls, and a locking mechanism is disposed between the coupler body and the outer sleeve. When the nipple is inserted into the coupler, the nipple is retained by the interaction of the outer set of coupling balls with a deep groove in the inner sleeve, and the inner set of coupling balls with a channel formed in the nipple. The nipple also opens the valve member within the coupler, thus allowing pressurized air to pass through the coupler. When the nipple is to be removed, the outer sleeve is initially moved rearwardly (upstream), the outer set of coupling balls move radially outward, which allows the inner sleeve, and hence the nipple, to move outwardly a predetermined amount until the outer set of coupling balls engages a shallow groove in the inner sleeve. In this position, the valve member is closed and pressure downstream of the nipple can exhaust to atmosphere. To fully disconnect the nipple from the coupler socket, the outer sleeve is moved forwardly (downstream), which allows the outer set of coupling balls to move further radially outward, and allows the inner sleeve to move further outwardly from the coupler until the inner set of coupling balls releases the nipple, which thereby allows the nipple to be fully disconnected from the coupler socket."

U.S. Pat. No. 5,445,395 discloses a "gasket for a claw or clamp quick-connection coupling, the gasket being constituted by a circularly symmetrical annular body defined by two parallel radial faces, an outer cylindrical surface surmounted by a partially toroidal bulge centered on the midplane of the gasket parallel to the radial faces, a partially toroidal inner surface also centered on the midplane, and connected to each of the radial faces via a respective chamfer-forming conical surface."

U.S. Pat. No. 5,474,336 discloses "[q]uick connect tube couplings are configured for use with unstepped bores in conventional fittings, valves, manifolds and similar devices. The couplings each include a tube support which axially abuts a brass sleeve utilized to retain the coupling in the bore. The tube support further includes a stepped portion which locates a primary O-ring seal for sealing directly with a tube connected by the coupling and a secondary O-ring seal which seals with the wall of the bore. In accordance with one embodiment of the invention, the tube support is molded of plastic and, in accordance with another embodiment of the invention, the tube support is brass in order to accommodate tubes with thicker walls."

U.S. Pat. No. 5,487,572 discloses a "coupling device for a tube, the device comprising a body provided with a bore for receiving the end of said tube, and means for retaining the tube in the bore, which means are constituted by an elastically deformable washer that is substantially frustoconical in shape whose inside circumference is of a diameter smaller than the outside diameter of the tube and which is subdivided into a plurality of teeth, the outside portion of the washer being disposed in a groove formed in the bore. Each tooth possesses a short root portion which, at rest, extends in a radial plane, and an active portion that is inclined relative to the radial plane of the root, and each tooth is connected to the teeth adjacent thereto via small section peripheral link portions of length not less than the length of each tooth."

U.S. Pat. No. 5,511,830 discloses a "quick connect tube coupling is configured for use with unstepped bores in conventional fittings, valves, manifolds and similar devices. The coupling includes a tubular tube support which has structure thereon for positively coupling with a brass sleeve which is utilized to retain the coupling in the bore. The tubular tube support further includes a stepped portion which locates a primary O-ring seal for sealing directly with a tube connected by the coupling and a secondary O-ring seal which seals with the wall of the bore. In accordance with a preferred embodiment, the tube support is molded of plastic and is polygonal in cross-section."

U.S. Pat. No. 5,553,901 discloses a "device for connecting a length of duct to a coupling endpiece of an apparatus or a member includes at least one tubular sleeve having two portions in axial succession, the first portion being internally fitted with components of an instant connection coupling for the end of a length of duct, the second portion including means for sealably and releasably covering the coupling endpiece, the end face of the endpiece forming an axial abutment at the end of the length engaged in the first portion of the sleeve."

U.S. Pat. No. 5,630,570 discloses a "quick coupling connector for removably connecting pipes, including a male member which is selectively connected within a female member to open a resiliently biased valve mounted within the female member. A safety ring is mounted about the female member and incorporates claws to axially retain the male member in a position intermediate a fully seated position within the female member and a fully released position after a first axial movement of a bush, which encloses both the male and female members, in a first direction opens a locking ring which also incorporates claws which are engageable with the male member and which normally secures the male member within the female member. In the intermediate position, a pipe associated with the male member is allowed to decompress after which the bush is moved in a second direction opposite the first direction, thereby releasing the claws of the safety ring and resulting in the release of the male member."

U.S. Pat. No. 5,636,662 discloses an "assembly includes a quick connect cartridge which is inserted into a port of a valve or manifold in a pneumatic system for coupling external fluid lines of the system to the valve or manifold. The components of the quick connect cartridge and the O-ring seal are mounted on the tubular shank of a plug. The plug is used as a shipping pin and is also used to install the components into a port of the valve or manifold. Normally, the plug is withdrawn from the port after the components are inserted in the port. If it is desired to keep the port closed after initial installation of the components, the plug may be retained in the port until it is time to connect the port. If it is desired to leave the port permanently closed, the plug remains in place. The plug can be an open plug allowing testing of the valve in which case a dust plug is provided for shipping purposes."

U.S. Pat. No. 5,639,064 discloses a "valve assembly includes a receptor valve assembly having a normally closed fluid passage, and an insert assembly having an open fluid passage. The insert assembly and the receptor valve assembly each include a valve activation structure engageable with one another for opening the fluid passage of the receptor valve assembly upon engagement of the valve activation structures and rotation of the insert assembly relative to the receptor valve assembly wherein their fluid passages are interconnected. The insert assembly and the receptor valve assembly are configured to provide substantially no fluid passage therebetween when closed."

U.S. Pat. No. 5,879,030 discloses a "coupling assembly for leak proof connection of the ends of two lengths of pipe or tubing. One end of a first pipe is coupled to a coupling box which is connected to or integrally formed on the end of a second pipe. The coupling box has threads for engaging a nut for securing the coupling. The coupling box has a bore for receiving the end of the first pipe. The end of the first pipe has an outer tapered surface for engaging an inner tapered surface of the coupling box to form a metal to metal seal between the first pipe and the coupling box. The bore also contains an engager for coupling the nut to the first pipe. The engager includes a split ring which has a longitudinal slot. The split ring has internal circumferential projections or gripping teeth which are aligned with external circumferential projections or gripping teeth on the end of the first pipe. As the nut is tightened, the split ring is compressed so that the gripping teeth of the split ring are brought into engagement with the gripping teeth or the first pipe. The split ring and the first pipe are then moved relative to the coupling box so that the outer tapered surface at the end of the pipe is forced into metal to metal sealing contact with the inner tapered surface within the bore of the coupling box."

U.S. Pat. No. 5,895,078 discloses a "quick coupling device comprising a female part (1) secured to the rigid endpiece (2) and in which a stepped bore is provided that presents a large diameter section (13) beyond an axial latch (15) that is movable between two positions, together with a banding ring (14) housed in removable manner inside the large diameter section (13) and fitted on its inside surface with at least one retaining projection (25) forming mechanism for axially linking the tube (7) to the banding ring (14) by biting into the outside surface of the tube, the axial latch (15) in one of its two positions opposing axial displacement of the banding ring (14) away from the rigid endpiece (2), and in its other position, releasing the banding ring."

U.S. Pat. No. 5,921,588 discloses a "push-in coupling for pipes contains a sleeve body (2) and a holding means, especially with a clamping body (6), for connecting a pipe end (3, 4) to the sleeve body (2). This push-in coupling permits proper handling with little effort during assembly, and insofar as possible prevents the danger of faulty assembly. A sliding body (50) is disposed within the sleeve body (2), the sliding body (50) being made independently of the holding means. The sliding body (50) contains a striker (52) which upon insertion of the pipe end (3, 4) is pushed over an edge (60), and upon reaching a given depth of insertion of the pipe end (3, 4) strikes against a surface (62) producing a detectable signal such as an acoustical signal and/or a vibration signal."

U.S. Pat. No. 5,911,443 discloses a "quick-coupling device in the form of an insertable cartridge for coupling a tube within a cylindrical housing, the device comprising a tubular insert having external means for anchoring it inside the housing and internal means for retaining the tube, together with a gasket; wherein the tubular insert has a nose of outside diameter that is smaller than the diameter of the means for anchoring the tubular insert and has a protection ring of inside diameter close to the outside diameter of the nose, said ring being mounted on the free end of the nose and being held axially relative to the nose by weak locking means in an axially projecting position relative to the nose for internally receiving the gasket."

U.S. Pat. No. 5,988,690 discloses a "junction device for joining a tube (3) to the body of a part (2) including a cylindrical endpiece (1) belonging to the part and defining a end face (6), and a coupling sleeve (11) having a first section (12) including releasable fastener means (13) for co-operating with corresponding means (5) on the coupling endpiece (1) and having a second section (14) axially adjacent to the first section (12) and including means (15) for opposing extraction of an end of the tube (3) placed in the sleeve (11) and in abutment against the end face (6) of the endpiece (1), in which the sleeve (11) is internally fitted with a guide ring (19) for guiding the end of the tube (3), the inside diameter (D) of the ring being substantially equal to the outside diameter of the tube (3), the ring possessing a first portion (20) mounted to slide in the second section (14) of the sleeve (11) and a second portion (21) projecting axially into the first section (12) of the sleeve (11), and the endpiece (1) being provided with a groove (7) formed in its end face (6) to receive and center the free end of the projecting second portion (31) of the ring (19) when the fastener means (5, 13) are in engagement."

U.S. Pat. No. 6,029,546 discloses a "reaction system for use in combination with a fluid-powered wrench tool in assembling or disassembling large size tube fittings of a variety including a fastener or nut which is threadably engagable with a port end of the fitting body. The system includes a reaction member attachable to the tool as extending along a central longitudinal axis disposed general parallel to the line of action of the cylinder assembly of the tool from a forward end face positionable in confrontation with the fastener to an opposite rearward end face. The system also includes an associated wrench member which is provided as having a rearward shank end mountable to the reaction member and a forward jaw end configured to receive the external surface of the fitting body in an engagement which delimits the rotation of the fitting body in a first direction about the axis of rotation of the fitting fastener."

U.S. Pat. No. 6,053,537 discloses a "connector for coupling a tube to an annular boss of a vessel wall, the annular boss having a wall with an inner surface. The connector includes a coupling body having first and second end portions with a throughway extending between the first and second end portions. The first end portion is adapted to receive and retain the tube. The second end portion includes an encircling seal and a grab ring to engage and retain the second end portion in the annular boss. The coupling body includes a sleeve encircling the second end portion, and an annular gap located between the sleeve and the second end portion for insertion of the wall of the annular boss into the annular gap to engage the seal and the grab ring, so that the sleeve supports the wall of the annular boss."

U.S. Pat. No. 6,145,887 discloses "a quick-coupling device for coupling a tube to a rigid element (50) having a bore, the device comprising a tubular insert (1) having means (7) enabling it to be anchored in the bore of the rigid element (50), declutchable tube retaining means (11), and a slide (13) mounted to move in translation in the tubular insert (1) to declutch the retaining means (11) when it is pushed into the tubular insert (1). The declutching slide (13) possesses a rear portion which projects outside the tubular insert (1) and which presents a shoulder surface (23) situated facing an end surface (24) of the tubular insert (1) and co-operating with said end surface to define a groove in which a removable intermediate ring (25) is received to oppose pushing in of the declutching slide (13)."

U.S. Pat. No. 6,206,435 discloses a "coupling device has a female part secured to a rigid endpiece. A stepped bore is provided that presents a large diameter section beyond an axial latch that is movable between two positions. A banding ring is housed in a removable manner inside the large diameter section and fitted on its inside surface with at least one retaining projection. The projection is used to axially link the tube to the banding ring by biting into the outside surface of the tube. An axial latch has two positions: one opposing axial displacement of the banding ring away from the rigid endpiece, the other releasing the banding ring."

U.S. Pat. No. 6,464,266 discloses a "fluid coupling having an outer housing with an internal bore, an O-ring fitted within the bore, a spacer bushing fitted against the O-ring, a gripper ring fitted against the axially outer side of the spacer ring, the gripper ring having axially and radially inwardly protruding circumferentially spaced gripping teeth, the teeth arranged for providing a twist when subjected to simultaneous rearward axial and rotational forces, and an end bushing holding the gripper ring, spacer bushing, and O-ring within the outer housing. A fluid coupling having an outer housing with an internal bore, an O-ring seal fitted within the bore, a spacer bushing fitted against the seal, a first gripper ring fitted against the axially outer side of the spacer ring, a second gripper ring fitted against the O-ring seal, the gripper rings having axially and radially inwardly protruding circumferentially spaced gripping teeth, in one embodiment the teeth arranged for providing a twist when subjected to simultaneous rearward axial and rotational forces, and an end bushing holding the gripper rings, spacer bushing, and O-ring within the outer housing."

U.S. Pat. No. 6,499,772 discloses a "radial conduit coupling is provided. The conduit coupling may include a tubular first connector having an exterior diameter, an interior diameter and first and second ends. The first end may be adapted to receive a first conduit. The second end may include at least one locking lug configured to cooperate with at least one shaped cavity associated with a component of a conduit system. The locking lug may extend from at least one tab lock disposed at the second end of the first connector. In one embodiment, a protrusion may extend from the interior diameter and generally separate the first end from the second end. The protrusion may include an interior diameter which generally corresponds to the interior diameter of the first conduit. A sealing surface may be disposed between the protrusion and the locking lug, and the sealing surface may be configured to cooperate with the second sealing surface associated with a second connector to form a generally fluid tight seal between the first connector and the second connector."

U.S. Pat. No. 6,517,115 discloses "a tubular insert (1) possessing external means (2) for fixing it in a bore (34) of the rigid element (30) and internal means for axially locking the tube inside the insert (1). The axial locking means comprise a sleeve (69) disposed inside the tubular insert (1) and possessing a broad end arranged to bear against an internal abutment member (75) of the tubular insert (61) and a narrow end that is elastically deformable in a radial direction between a small rest configuration where it forms an abutment for a shoulder (93) of the tube (90) and an enlarged elastically deformed configuration allowing the shoulder of the tube to pass through while it is being inserted."

U.S. Pat. No. 6,588,805 discloses "a pre-assembled, high-pressure coupling interface adapter for use with a non-threaded port of a female member. The adapter comprises a generally cylindrically shaped metal body including a central longitudinal channel and an inner and outer surface. The body includes an external segment having an external end and an internal segment having an internal end, the internal segment configured for receipt within the port of the female member. The inner surface of the body is configured to engage and secure one or more external features of a separate male coupling member. The present invention also includes a coupling assembly including a coupling adapter and a method for forming a female coupling assembly including an adapter."

U.S. Pat. No. 6,679,528 discloses a "device for quickly coupling a tube to an element comprises a tubular endpiece (1) subdivided along its axis (2) into a first portion (3) for connecting to the tube and a second portion (4) for coupling to the element (100), and fastening means (3.1, 15) for securing the tube to the endpiece and the endpiece to the element, the second portion (4) of the endpiece (1) possessing a groove (8) for receiving a sealing gasket (9). The endpiece (1) is fitted with a sleeve (10) for protecting the gasket (9), which sleeve is mounted to slide between a position in which it overlies the groove (8), thereby protecting the gasket (9), and a disengaged position which is offset relative to the groove (8)."

U.S. Pat. No. 6,764,106 discloses a "coupling, comprised of a tube with an attached tubular shell, for attachment with external components. The tube has a first end, second end and a longitudinal bore extending therethrough. The tube further includes an intermediate portion between the first and second ends having spaced radially outwardly extending annular beads. The tubular shell has a first portion axially confined between the annular beads and has an inner surface with a first axial end and a second axial end, wherein one of the first and the second inner axial ends has a non-rounded shape. The shell has a second portion extending axially from the first portion to a free end and has an inner surface spaced radially and coaxially outwardly of the exterior of the tube second end to define an annular recess therebetween and is adapted to be inwardly deformed toward the tube second end."

U.S. Pat. No. 6,769,721 discloses a "molded plastic tubular coupling including a plastic sleeve having an integral head at one end. The sleeve provides a cylindrical outer surface to engage in a corresponding bore of another component. The cylindrical outer surface has an encircling annular recess and an integral radially extending flexible annular diaphragm formed in the recess. The diaphragm has an outer periphery extending outwardly from the cylindrical surface to engage and grip the corresponding surface of another component."

U.S. Pat. No. 6,851,726 discloses a "radial conduit coupling is provided. The conduit coupling may include a tubular first connector having an exterior diameter, an interior diameter and first and second ends. The first end may be adapted to receive a first conduit. The second end may include at least one locking lug configured to cooperate with at least one shaped cavity associated with a component of a conduit system. The locking lug may extend from at least one tab lock disposed at the second end of the first connector. In one embodiment, a protrusion may extend from the interior diameter and generally separate the first end from the second end. The protrusion may include an interior diameter which generally corresponds to the interior diameter of the first conduit. A sealing surface may be disposed between the protrusion and the locking lug, and the sealing surface may be configured to cooperate with the second sealing surface associated with a second connector to form a generally fluid tight seal between the first connector and the second connector."

U.S. Pat. No. 6,860,523 discloses a "fluid coupling having an outer housing with an internal bore, an O-ring fitted within the bore, a spacer bushing fitted against the O-ring, a gripper ring fitted against the axially outer side of the spacer ring, the gripper ring having axially and radially inwardly circumferentially spaced gripping teeth, the teeth arranged for providing a twist when subjected to simultaneous rearward axial and rotational forces, and an end bushing holding the gripper ring, spacer bushing, and O-ring within the outer housing. A fluid coupling having an outer housing with an internal bore, an O-ring seal fitted within the bore, a spacer bushing fitted against the seal, a first gripper ring fitted against the axially outer side of the spacer ring, a second gripper ring fitted against the O-ring seal, the gripper rings having axially and radially inwardly protruding circumferentially spaced gripping teeth, in one embodiment the teeth arranged for providing a twist when subjected to simultaneous rearward axial and rotational forces, and an end bushing holding the gripper rings, spacer bushing, and O-ring within the outer housing."

U.S. Pat. No. 6,863,314 discloses a "coupling for a tube having a coupling body with a throughway open at one end to receive an end portion of a tube, a sealing ring or rings mounted in the coupling body at a location spaced from said open end thereof to engage and seal with the outer periphery of the tube, and a tube latching device for locking a tube in the coupling body. The latching device comprises a first latch within the coupling body to engage automatically with a feature on the tube when the tube end portion has been inserted sufficiently into the throughway to engage with the seals to retain the tube end portion in the coupling body and a second manually operable latch disposed externally of the coupling body engageable with a feature on the tube when the end portion of the tube has been inserted into the coupling body sufficient for the first latch to engage to provide a secondary retention for the tube in the coupling body."

U.S. Pat. No. 6,880,865 discloses a "tube coupling includes a coupling body having a throughway open at one end to receive an end portion of a tube, an annular step in the throughway facing the open end to provide an end stop for a tube end, and an end cap engaging the coupling body for axial movement between forward and retracted positions on the body. The end cap has an opening for the end portion of the tube to extend therethrough and a tube locking collet in the cap to permit entry of a tube into the cap and to resist withdrawal. An annular seal is located in the coupling body adjacent the annular step, the seal having an inner annular portion with which the tube end is engageable and an outer annular portion, and a sleeve between the locking device and seal to compress the outer annular portion of the seal axially."

U.S. Pat. No. 6,929,289 discloses "a tube coupler for receiving and securely holding a tube. The tube may be inserted into an opening in an end cap, which engages a coupling body for axial movement between forward and retracted positions on the coupling body. By moving the end cap from the retracted position to the forward position, an end of the tube is drawn into the coupling body to engage and seal against an in-turned annular flange of a seal. Further, as the tube is drawn into the coupling body the seal is compressed around an outer surface of the tube to further seal the tube within the tube coupling."

U.S. Pat. No. 6,957,833 discloses a "tube coupling includes a coupling body having a throughway open at one end to receive an end portion of a tube. A seal encircles the throughway to seal with the outer face and end of the tube. A cap mounted on the body has a tube locking device to engage and hold the tube in the coupling body. The cap and body have interengaging structure which guide the cap on the body for rotation and simultaneous axial movement between a first position on the coupling body and a second position further along the body. As such, when the cap is in the first position the tube can be inserted through the cap into the seal in the throughway and held therein by the locking device and on rotating the cap into the second position, the tube held by the locking device is forced against the seal in the throughway."

U.S. Pat. No. 6,964,436 discloses a "coupler having a tubular body (6) which is arranged to receive a tubular element for transporting fluid and including a pipe end, and which is provided with elements (11) for snap-fastening the tubular element, the coupler including a bushing (15) provided on the inside with elements (23, 25) for retaining the pipe end, which elements are selectively activatable and deactivatable, wherein the bushing is mounted in the tubular body to be movable axially between a position for activating the retaining elements and a position for deactivating the retaining elements, and wherein the bushing is provided with snap-fastening elements complementary to those of the body for co-operating therewith in the activation position."

U.S. Pat. No. 7,011,342 discloses a "device for coupling an end of a hose to a member, comprises a body provided with an internal channel opening out into a chamber having quick-connection elements for connecting the end of the hose to the channel. The quick-connection elements comprise a washer with teeth disposed in the chamber and associated with a tubular disconnection pusher which is mounted to slide inside the chamber and which possesses a drive end projecting outside the body, and an opposite end for lifting the teeth. The device comprises protection elements for protecting the connection, which include a sleeve (18) possessing axially in succession: a connection portion (19) for connection to the body extending around the drive end; and a hose guide portion (20) which is secured to the connection portion via an end opposite from the body and which extends beyond the drive end coaxially with the internal channel."

U.S. Pat. No. 7,014,218 discloses a "permanently attachable hose coupling for a pressurized conduit end having a generally tubular nipple and a generally cylindrical shell permanently attached to the nipple and generally surrounding the conduit end. The nipple has a longitudinal axis, first and second ends, a series of circumferential grooves located between the first and the second ends, a longitudinal through bore, and an insert portion adjacent the plurality of grooves for insertion in the conduit. Each of the series of circumferential grooves fixedly receive at least one of an inside surface, an end surface and an outside surface of the generally cylindrical shell and each of the grooves has a generally flat base portion parallel to the longitudinal axis, a first substantially vertically oriented sidewall adjacent the generally flat base portion and a second substantially vertically oriented sidewall."

U.S. Pat. No. 7,032,932 discloses a "tube coupling comprising a coupling body having a throughway open at one end to receive an end portion of the tube and having an internal cam surface tapering towards the open end in which a collet is located for locking the tube in the coupling body by engagement with the tapered cam surface. The coupling body has a main body portion the throughway of which receives the end of the tube and a stop to limit the insertion of the collet and an end cap in screw threaded engagement with the main body having an open end into the throughway and the tapered cam surface. The cap is retained on the main body by an annular diaphragm encircling the body which engages in a wide slot formed in the inner periphery of the cap. The diaphragm snaps into the slot when the cap is screwed onto the main body portion to a first position in which a tube can be inserted through the collet into the coupling body and released. The diaphragm allows the cap to be screwed further onto the coupling body to a position in which the collet is locked to the tube to prevent release of the tube."

U.S. Pat. No. 7,100,948 discloses a "tube coupling has a coupling body with a throughway open at one end to receive an end portion of a tube. A seal encircles the throughway to seal with the periphery and end of the tube and a cap is mounted on the body having a tube locking device rotatably mounted in the cap to engage and hold the tube in the cap. The cap and body have interengaging means which guide the cap on the body in an axial direction along the body with rotation of the cap from a first position in which a tube can be inserted through the cap and into the seal in the throughway and retained by the locking device and a second position advanced along the coupling body from said one end in which the tube end is held positively in engagement with the seal in the throughway. The locking device engages via a ring with the coupling body to resist rotation of the locking device with respect to the body whereby rotation of the cap between said the first and second positions does not cause the tube to rotate."

U.S. Pat. No. 7,192,062 discloses a "quick-connect cartridge assembly includes a ring, a collar disposed within the ring, and an annular seal coaxially disposed with respect to the ring and the collar. A plug having a shank with an outer diameter substantially similar to the inner diameter of the collar is slidably received within the collar and is held within the collar by a friction fit. The plug is also received through the annular seal so as to establish a coaxial relationship with the ring, the collar and the annular seal. The plug includes one or more features for facilitating installation of the ring, the collar and the annular seal into a port and subsequent removal of the plug from the components after installation."

U.S. Pat. No. 7,232,159 discloses a "fluid coupling having an outer housing with an internal bore, an O-ring fitted within the bore, a spacer bushing fitted against the O-ring, a gripper ring fitted against the axially outer side of the spacer ring, the gripper ring having axially and radially inwardly protruding circumferentially spaced gripping teeth, and an end bushing holding the gripper ring, spacer bushing, and O-ring within the outer housing. A second gripper ring and a second spacer ring are used in some embodiments."

U.S. Pat. No. 7,273,235 discloses "a washer for a tube coupler device, the washer having an inner portion subdivided into a plurality of teeth with active portions having a free edge that defines an inside edge of the washer and that is arranged to penetrate into an outside surface of the tube, wherein the active portions are arranged so that the inside edge is substantially continuous. The invention also provides a method of making the washer and a coupler device."

U.S. Pat. No. RE38786 discloses "a tube coupling comprising a coupling body having a throughway open at one end of the body to receive a tube. A collet is located in the throughway having an annular element and at least one radially resilient finger extending axially from the element toward said open end of the throughway. The coupling body has a stop face directed along the throughway axis away from said open end and the distal end of the finger has on its inner side a projection to engage a feature on the tube and on its outer side a first, axially facing abutment directed towards the open end of the throughway to engage with the stop face and a further, radially facing abutment engageable with the coupling body when the axially facing abutment engages the stop face to constrain the distal end of the finger against radial outward movement and thereby to prevent release of the projection on the finger from the feature on the tube and release of the tube from the coupling body."

U.S. Patent Application Publication No. 20030116960 discloses a "connector for releasably retaining tubing includes a coupler bore with a O-ring member, a co-axial guide member, a stationary grip-ring member having a radially deployable toothed distal end for grippingly engaging the terminal portion of tubing, and a sleeve limiter disposed around the ring member for restricting ring member axial movement. A release member laterally deploys the toothed distal end and additionally operates in concert with inserted tubing to cause radial deployment of the distal end to cause surrounding receipt of the tubing. The release member then moves to a non-release position upon minimal reverse-direction tubing travel for automatic tubing retention by the toothed distal end of the stationary grip ring member. Hand movement of the release member radially deploys the toothed distal end which results in release thereof of the retained tubing and its withdrawability from the connector."

U.S. Patent Application Publication No. 20050104367 discloses a "fastener washer for a tube coupling device, the washer being deformable and having an inside circumference subdivided into a plurality of teeth (2) each possessing an active portion (3) connected via an intermediate portion (4) to a root portion (5), the intermediate portion being defined laterally by two parallel edges (9), and the active portion having a width (A) that is greater than a width (C) of the intermediate portion between the two parallel edges."

U.S. Patent Application Publication No. 20070194568 discloses a "tube coupling includes a body having a cylindrical projection to engage in a tube to be secured to the body. A grab ring is mounted by arms having openings to snap onto abutments on the coupling body. The grab ring encircles with a clearance the projection and engages an outer surface of a tube pushed onto the projection to grip and resist withdrawal of the tube from the projection."

European Patent No. EP1258666B9 discloses "[i]Instant coupling consists of a rigid body (1), preferably of an injection-molded plastic material, with a tubular insert (4) which fits in the end of the pipe (2) and has a peripheral groove (6) for a seal (7), with an outer fastening ring (15) containing a gripping element (16) for the pipe's outer surface. Instant coupling consists of a rigid body (1), preferably of an injection-molded plastic material, with a tubular insert (4) which fits in the end of the pipe (2) and has a peripheral groove (6) for a seal (7), with an outer fastening ring (15) containing a gripping element (16) for the pipe's outer surface. The fastening ring has a rigid tubular connecting section (20) and an annular chamber (21) with a tapering locking section (22) containing the gripping element."

The inventions disclosed and taught herein are directed to improved valve connections for pneumatic and hydraulic control valves.

BRIEF SUMMARY OF THE INVENTION

A valve assembly comprising: a valve body; at least one port to receive tubing; and a collar to secure the tubing to the port, wherein the collar is selected from a first collar group configured to secure the tubing by a flattening a washer, thereby driving teeth of the washer into the tubing, and a second collar group having a smooth interior surface to which the tubing is bonded, wherein either the first or the second collar groups may be interchangeably threaded onto the port. In one embodiment the washer includes a planar outer area and an initially conical inner area with inwardly projecting teeth. The inner area of the washer may be flattened to be planar with the outer area when the first collar is threaded onto the port. The valve assembly may include two identical ports, a first collar, the washer, a second collar, a first tubing and a second tubing, with the first tubing being a different type with respect to the second tubing. The first collar may be threaded onto one of the ports, thereby securing the first tubing by driving the teeth of the washer into the first tubing, and the second collar may be threaded onto another one of the ports with the second sleeve being bonded to the second tubing. The valve assembly may include a gasket between the port and the sleeve. The valve assembly may include a gasket between the valve body and the sleeve. The valve assembly may include an o-ring between the collar and the tubing. The valve assembly may include an o-ring between the port and the tubing. The o-ring may have an oval cross section and be configured to shrink its internal diameter as the first collar is threaded onto the port. The valve assembly may include an o-ring between the valve body and the tubing. The first collar group may include a sleeve between a first collar and the tubing, adjacent the port, with the sleeve configured to flatten the washer, thereby driving the teeth of the washer into the tubing as the first collar is threaded onto the port. The first collar group may include a spacer between the washer and the port, with the spacer configured to compress the washer against the sleeve as a first collar is threaded onto the port thereby driving the teeth of the washer into the tubing. The washer may be configured to not touch the tubing as the tubing is inserted into the collar. The washer may be resilient such that the teeth expand away from the tubing as the first collar is threaded off the port, thereby allowing the tubing to be removed from the first collar group. The valve assembly may include a o-ring configured to not touch the tubing as the tubing is inserted into the collar, wherein the o-ring forms a seal with the tubing as the collar is threaded onto the port.

DETAILED DESCRIPTION OF THE INVENTION

Figure 1:
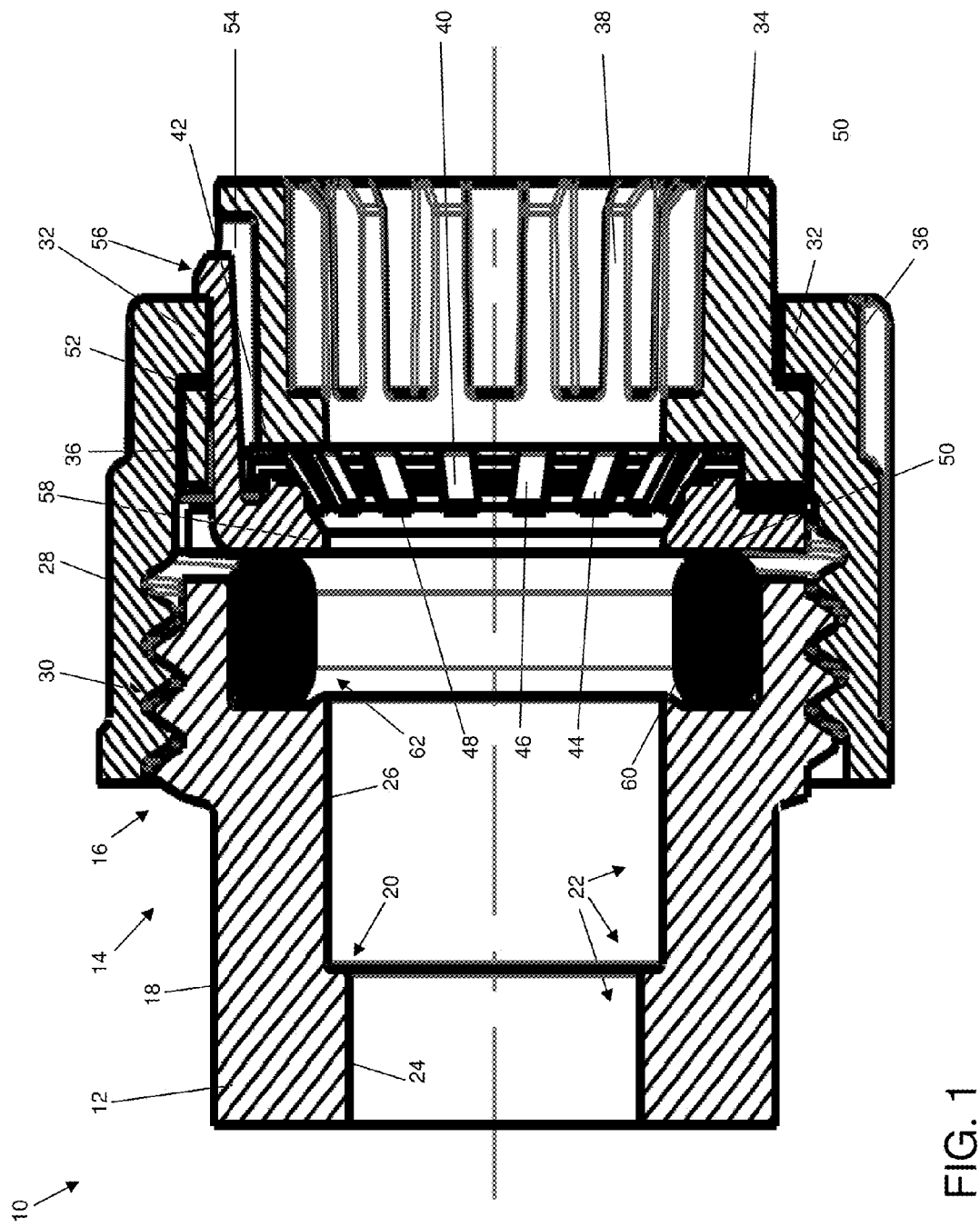
FIG. 1 illustrates a particular embodiment of a valve connection utilizing certain aspects of the present inventions, shown in an initial state.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a valve assembly comprising: a valve body; at least one port to receive tubing; and a collar to secure the tubing to the port, wherein the collar is selected from a first collar group configured to secure the tubing by a flattening a washer, thereby driving teeth of the washer into the tubing, and a second collar group having a smooth interior surface to which the tubing is bonded, wherein either the first or the second collar groups may be interchangeably threaded onto the port. In one embodiment the washer includes a planar outer area and an initially conical inner area with inwardly projecting teeth. The inner area of the washer may be flattened to be planar with the outer area when the first collar is threaded onto the port. The valve assembly may include two identical ports, a first collar, the washer, a second collar, a first tubing and a second tubing, with the first tubing being a different type with respect to the second tubing. The first collar may be threaded onto one of the ports, thereby securing the first tubing by driving the teeth of the washer into the first tubing, and the second collar may be threaded onto another one of the ports with the second sleeve being bonded to the second tubing. The valve assembly may include a gasket between the port and the sleeve. The valve assembly may include a gasket between the valve body and the sleeve. The valve assembly may include an o-ring between the collar and the tubing. The valve assembly may include an o-ring between the port and the tubing. The o-ring may have an oval cross section and be configured to shrink its internal diameter as the first collar is threaded onto the port. The valve assembly may include an o-ring between the valve body and the tubing. The first collar group may include a sleeve between a first collar and the tubing, adjacent the port, with the sleeve configured to flatten the washer, thereby driving the teeth of the washer into the tubing as the first collar is threaded onto the port. The first collar group may include a spacer between the washer and the port, with the spacer configured to compress the washer against the sleeve as a first collar is threaded onto the port thereby driving the teeth of the washer into the tubing. The washer may be configured to not touch the tubing as the tubing is inserted into the collar. The washer may be resilient such that the teeth expand away from the tubing as the first collar is threaded off the port, thereby allowing the tubing to be removed from the first collar group. The valve assembly may include a o-ring configured to not touch the tubing as the tubing is inserted into the collar, wherein the o-ring forms a seal with the tubing as the collar is threaded onto the port.

FIG. 1 is an illustration of a particular embodiment of a valve connection utilizing certain aspects of the present inventions, shown in an initial state. More particularly, a valve assembly 10 is shown, comprising a valve body 12 with a port 14 thereon. The valve body 12 may have one, two, three, or more ports 14 for use as a pneumatic and/or hydraulic control valve. Therefore, the valve body 12 preferably includes other components typically found in such pneumatic and/or hydraulic control valves available from ASCO Valve, Inc.

As shown, the port 14 preferably includes external threads 16 around its external diameter 18. The port 14 may also include a tubing seat 20 along its internal diameter 22, with a proximate portion 24 having a smaller internal diameter and a distal portion 26 having a larger internal diameter, with the tubing seat 20 therebetween. In one embodiment, the smaller internal diameter of the proximate portion 24 is similar to an internal diameter of tubing (not shown) to be secured to the port 14 and the larger internal diameter of the distal portion 26 is approximately the same as an outer diameter of the tubing (not shown) to be secured to the port 14.

The valve assembly 10 also preferably includes a collar 28, with internal threads 30 to mesh with the external threads 16 of the port 14. The collar 28 also preferably includes an inwardly facing projection 32 to operate other components of a collar group when completing a connection between the valve body 12, or port 14, and the tubing (not shown).

The collar group may also include a sleeve 34 with an outwardly facing projection 36 to mate with the inwardly facing projection 32 of the collar 28, as the collar 28 is threaded onto the valve body 12, or port 14. The sleeve 34 preferably has an internal diameter 38 approximately the same as the outer diameter of the tubing (not shown) to be secured to the port 14.

The collar group may also include a locking ring, or washer, 40 to secure the tubing (not shown) to the port 14. The washer 40 preferably includes a planar outer area 42 and an initially conical inner area 44 with inwardly projecting teeth 46. An inner diameter 48 of the teeth 46 changes as the washer 40 is compressed, as the conical inner area 44 is flattened. However, initially, the inner diameter 48 of the teeth 46 is preferably larger than the outer diameter of the tubing (not shown) to be secured to the port 14. As the washer 40 is compressed, or flattened, the inner diameter 48 of the teeth 46 preferably shrinks such that, in a completed state with the washer 40 fully compressed, the inner diameter 48 of the teeth 46 is preferably smaller than the outer diameter of the tubing (not shown) to be secured to the port 14. In this manner, compressing, or flattening, the washer 40 drives the teeth 46 of the washer 40 into the tubing (not shown), thereby securing the tubing to the port 14.

In some embodiments, the washer 40 may be configured to be flattened such that the teeth 46 are planar with the outer area 42 when the collar 28 is fully threaded onto the port 14. Alternatively, the washer 40 may be configured to be merely flatten the teeth 46 to a lesser degree, such that they are not planar with the outer area 42 when the collar 28 is fully threaded onto the port 14. In some embodiments, the washer 40 may be resilient, such that as forces compressing, or flattening, the washer 40 are reduced, the inner diameter 48 of the teeth 46 expands back to the initial inner diameter 48 of the teeth 46, larger than the outer diameter of the tubing, thereby allowing the tubing to be removed from the port 14.

The collar group may also include a spacer 50 between the valve body 12, or port 14, and the sleeve 34. The washer 40 may be compressed or flattened between the spacer 50 and the sleeve 34. In some embodiments, the spacer 50 may include one or more tabs 52 that may fit into one or more slots 54 in the sleeve 34, thereby aligning and/or retaining the spacer 50 with the sleeve 34. To further retain the spacer 50 with the sleeve 34, the tab(s) 52 may include one or more flanges 56 to engage the outwardly facing projection 36 of the sleeve 34. In some embodiments, to retain the spacer 50 and the sleeve 34 with the collar 28, the tabs 52 may extend far enough to permit the flange(s) 56 to engage the inwardly facing projection 32 of the collar 28. To aid in assembly, the flange(s) 56 may have a bevel to ease their fitment into the slot(s) 54 in the sleeve 34 and slide past the outwardly facing projection 36 of the sleeve 34, and/or inwardly facing projection 32 of the collar 28.

Where the washer 40 is not designed to be compressed, or flattened, completely planar, an interior portion 58 of the spacer 50 may be beveled to accommodate the conical shape of the conical inner area 44, and inwardly projecting teeth 46. In alternative embodiments, such as where the washer 40 is designed to be flattened completely planar, the interior portion 58 of the spacer 50 may be squared.

The valve assembly 10 may also include an o-ring 60, or gasket, to seal the tubing (not shown) to the port. In one embodiment, the o-ring 60 has an oval shaped cross section, with the long axis more aligned parallel to the tubing, which will be discussed in more detail below. The o-ring 60 includes an inner diameter 62 that is preferably initially larger than the outer diameter of the tubing (not shown) to be secured to the port 14. As the collar 28 is threaded onto the port 14, as will be discussed in more detail below, the inner diameter 62 preferably shrinks to complete the seal between the tubing and the port 14.

Figure 2:
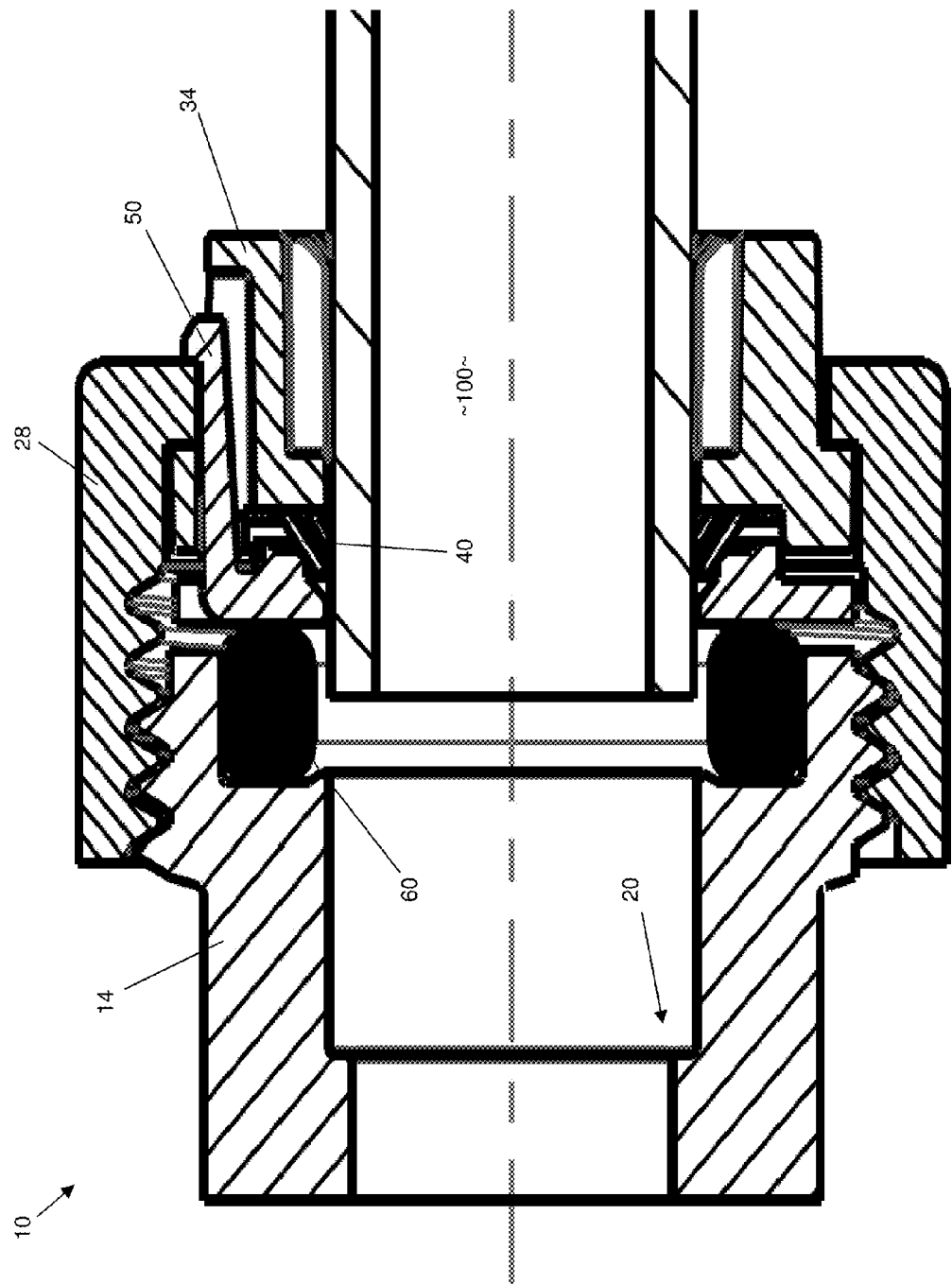
FIG. 2 illustrates a particular embodiment of the valve connection of FIG. 1 utilizing certain aspects of the present inventions, shown with tubing being inserted therein.
Figure 3:
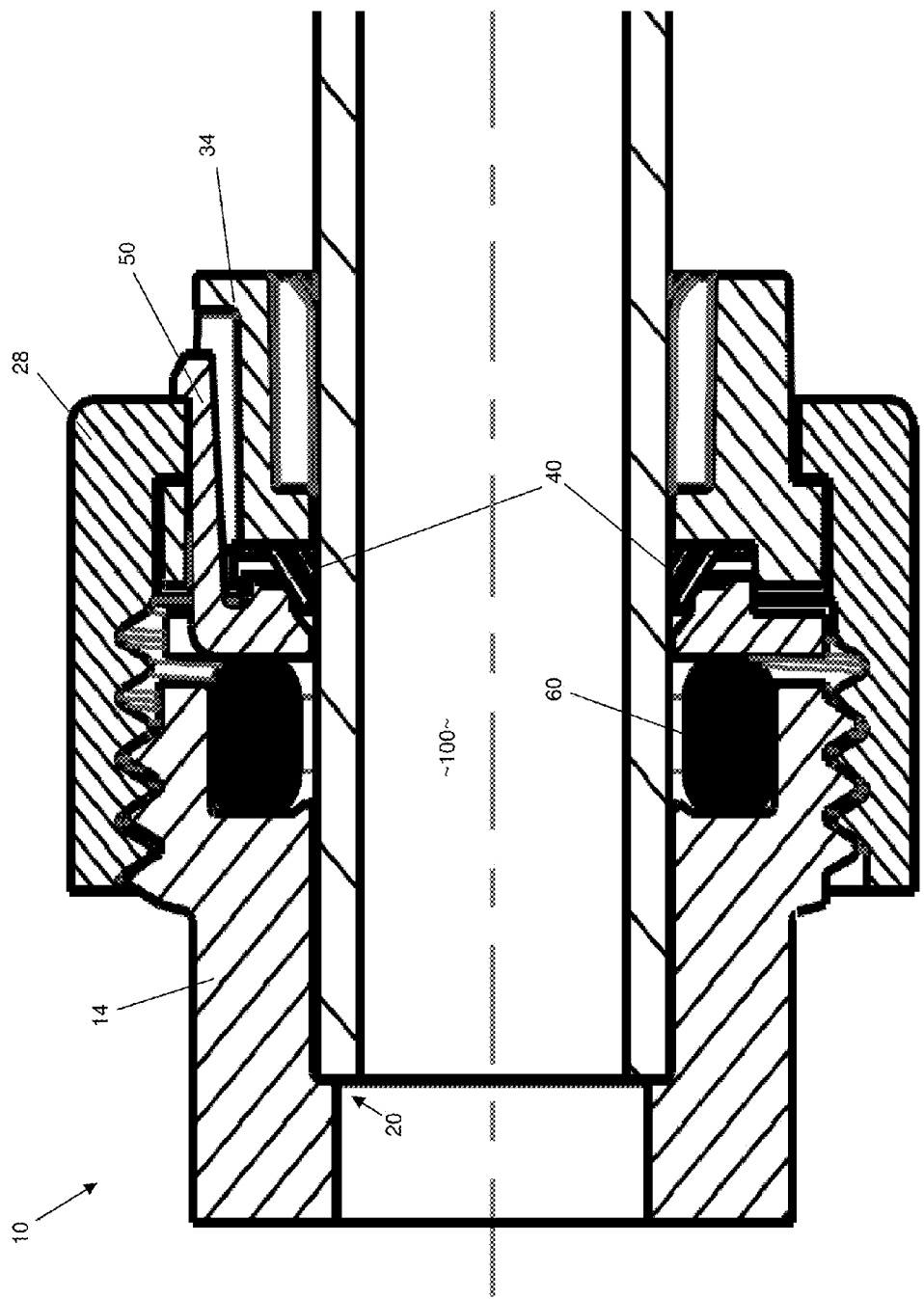
FIG. 3 illustrates a particular embodiment of the valve connection of FIG. 1 utilizing certain aspects of the present inventions, shown with tubing fully inserted therein.

Referring also to FIG. 2, the tubing 100 is shown being inserted into, or withdrawn from, the port 14 and collar group comprising the collar 28, sleeve 34, washer 40, and spacer 50. As can be seen, the outer diameter of the tubing 100 is smaller than the initial inner diameter 48 of the teeth 46, and the conical inner area 44, of the washer 40. The outer diameter of the tubing 100 is also smaller than the initial inner diameter 62 of the o-ring 60. Thus, the tubing 100 may be slid into the port 14, to the seat 20, without contacting, damaging, or being damaged by the washer 44 and/or o-ring 60, as shown in FIG. 3.

Figure 4:
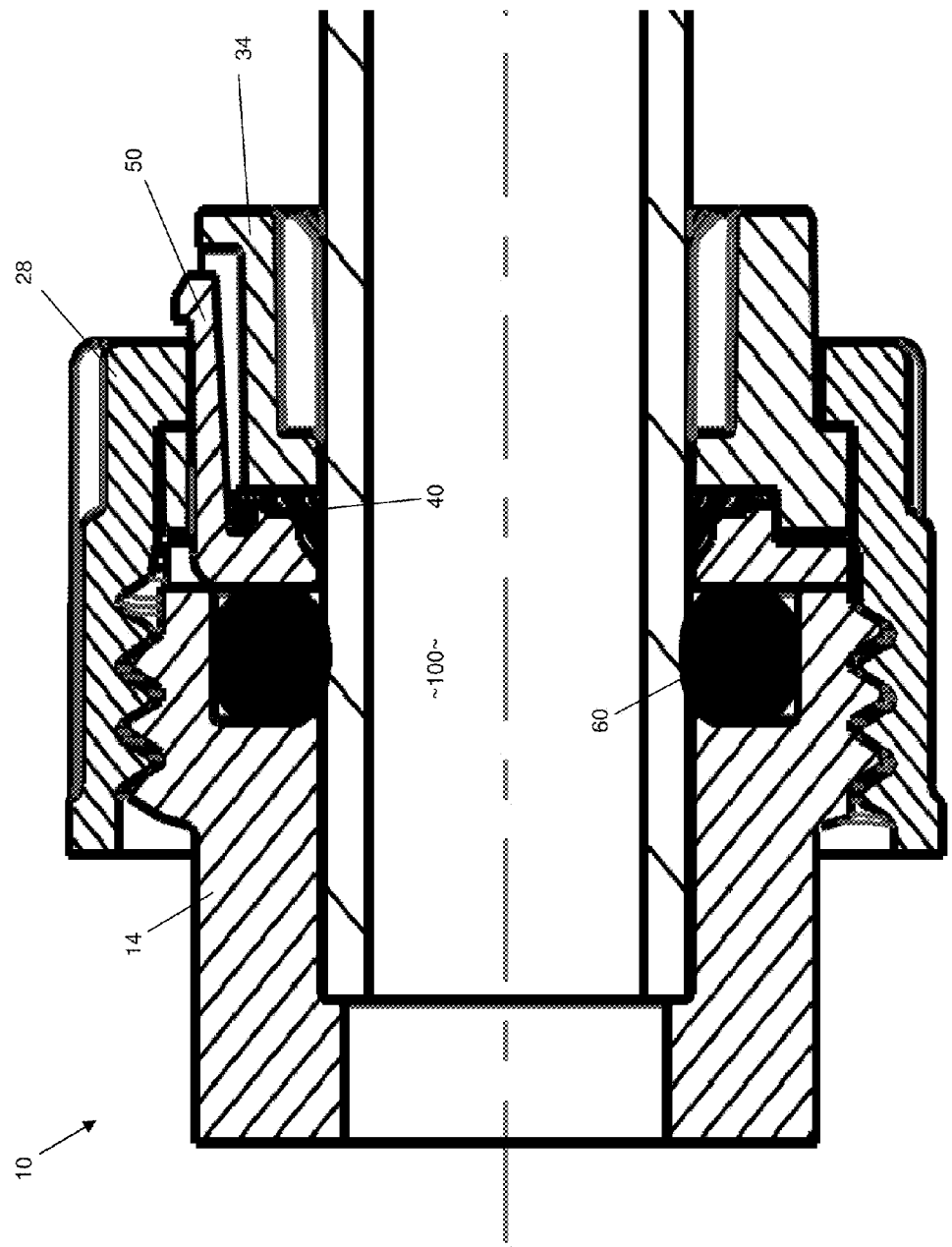
FIG. 4 illustrates a particular embodiment of the valve connection of FIG. 1 utilizing certain aspects of the present inventions, shown in a transition state.

Referring also to FIG. 4, with the tubing 100 against the seat 20, the collar 28 may be threaded onto the port 14, further transitioning to a completed valve connection. As the collar 28 is threaded onto the port 14, the spacer 50 is slid toward the port 14. As the spacer 50 engages the o-ring 60, and continues inward, the axis of the o-ring 60 is compressed, thereby shrinking the inner diameter 62 to complete the seal between the tubing 100 and the port 14. As the collar 28 is further threaded onto the port 14, the spacer 50 engages the port 14, sandwiching the o-ring between the spacer 50 and the port 14.

Figure 5:
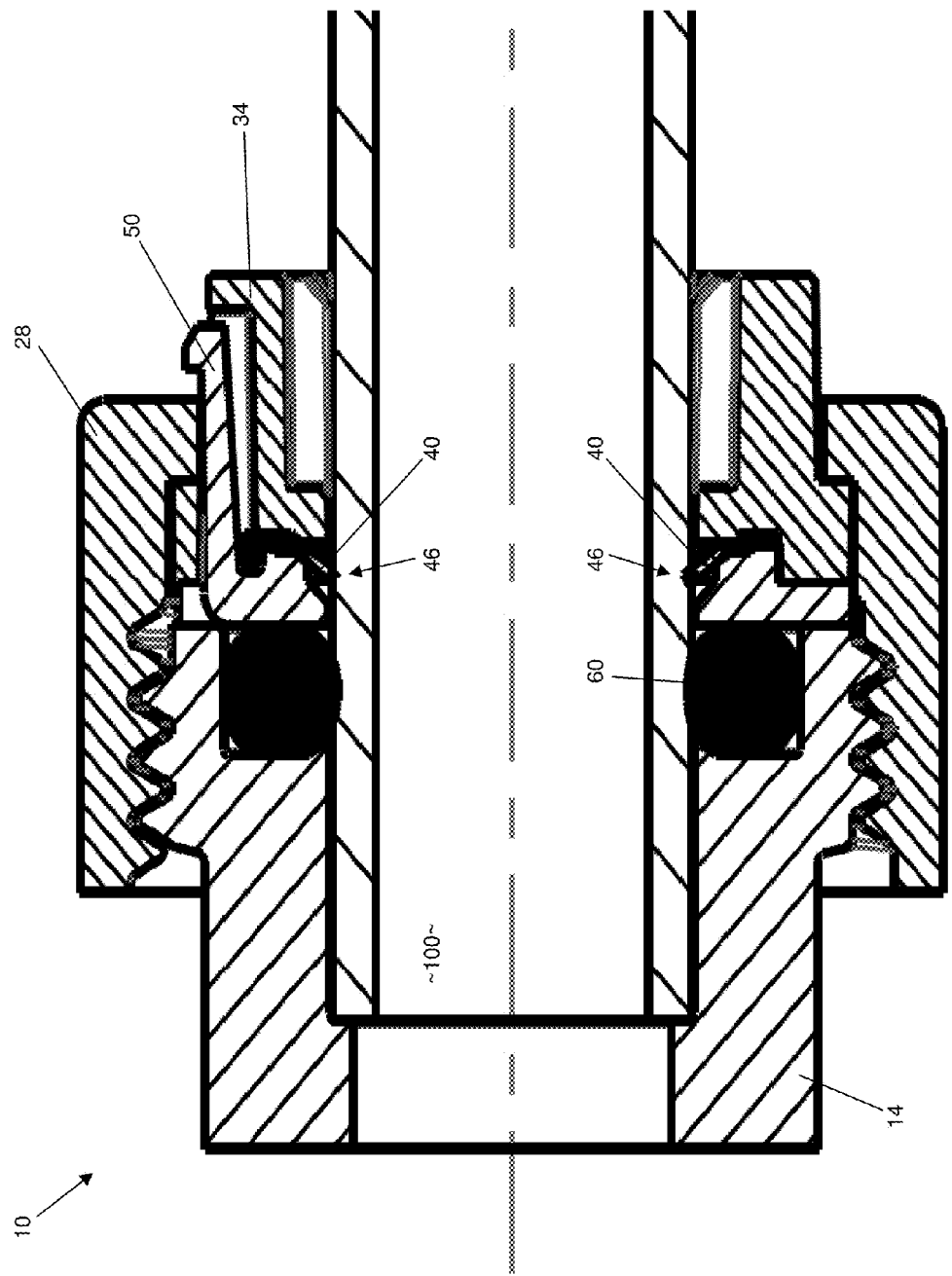
FIG. 5 illustrates a particular embodiment of the valve connection of FIG. 1 utilizing certain aspects of the present inventions, shown in a completed state.

Referring also to FIG. 5, as the collar 28 is further threaded onto the port 14, the spacer 50 also forcibly engages the washer 40, flattening the washer 40 and driving the teeth 46 of the washer 40 into the tubing 100, thereby securing the tubing 100 to the port 14. As discussed above, the washer 40 may be resilient, and the o-ring 60 is preferably resilient, such that loosening the collar 28 from the port 14 may relax the washer 40 and the o-ring 60, thereby allowing the tubing 100 to be removed from the port 14.

Figure 6:
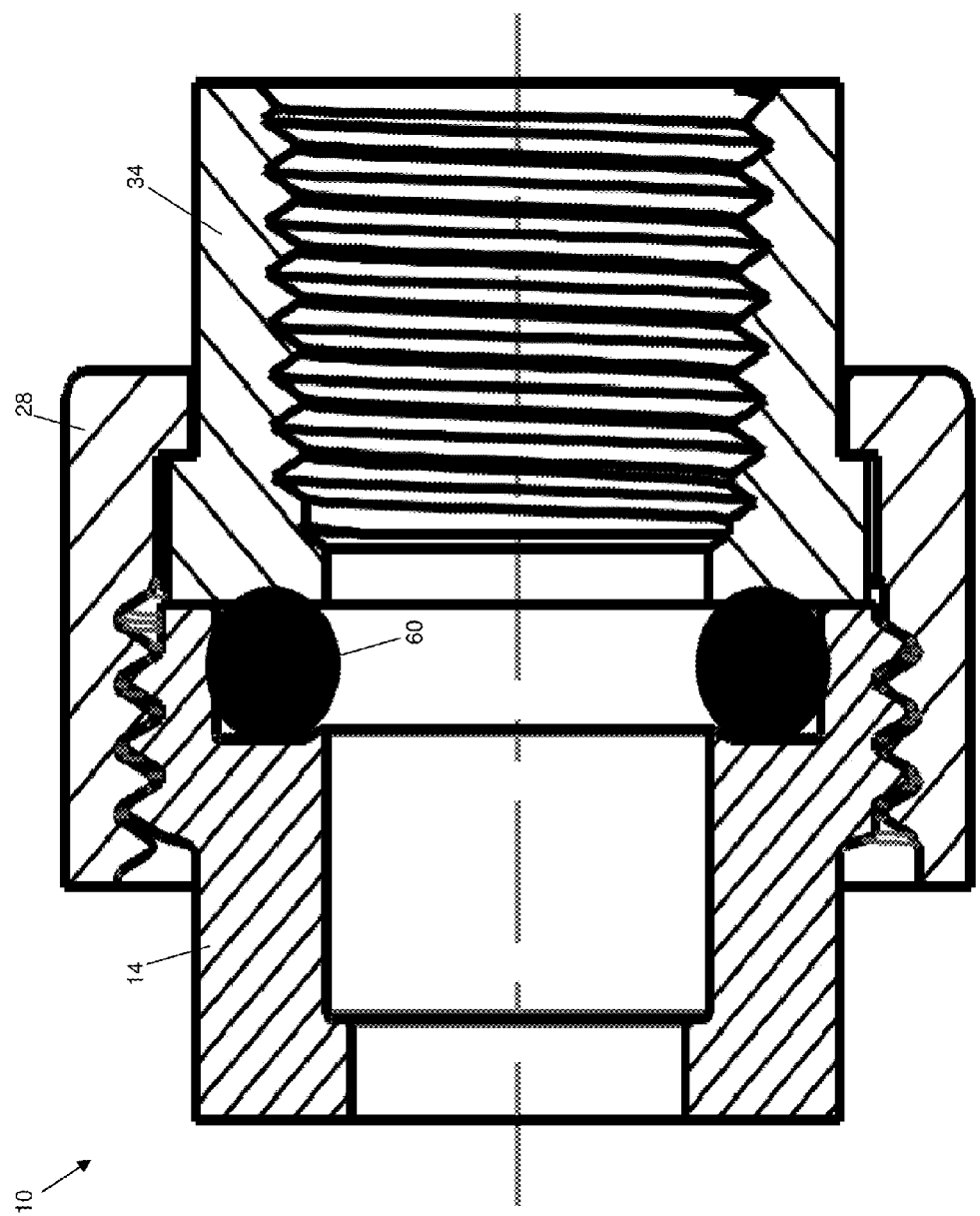
FIG. 6 illustrates a particular embodiment of another valve connection utilizing certain aspects of the present inventions.

FIG. 6 illustrates an additional, or alternative, configuration. The valve body 12 and port 14 are preferably identical to those described above. Select components of a collar group of this configuration may be interchangeable and/or identical to corresponding components of the collar group described above. For example, the collar 28 may be identical to those described above. This embodiment, or configuration, however may not utilize the washer 40 and/or spacer 50. Instead, the sleeve 34 may be threaded to receive threaded tubing or pipe. The o-ring 60 may provide a seal between the port 14 and the sleeve 34.

Figure 7:
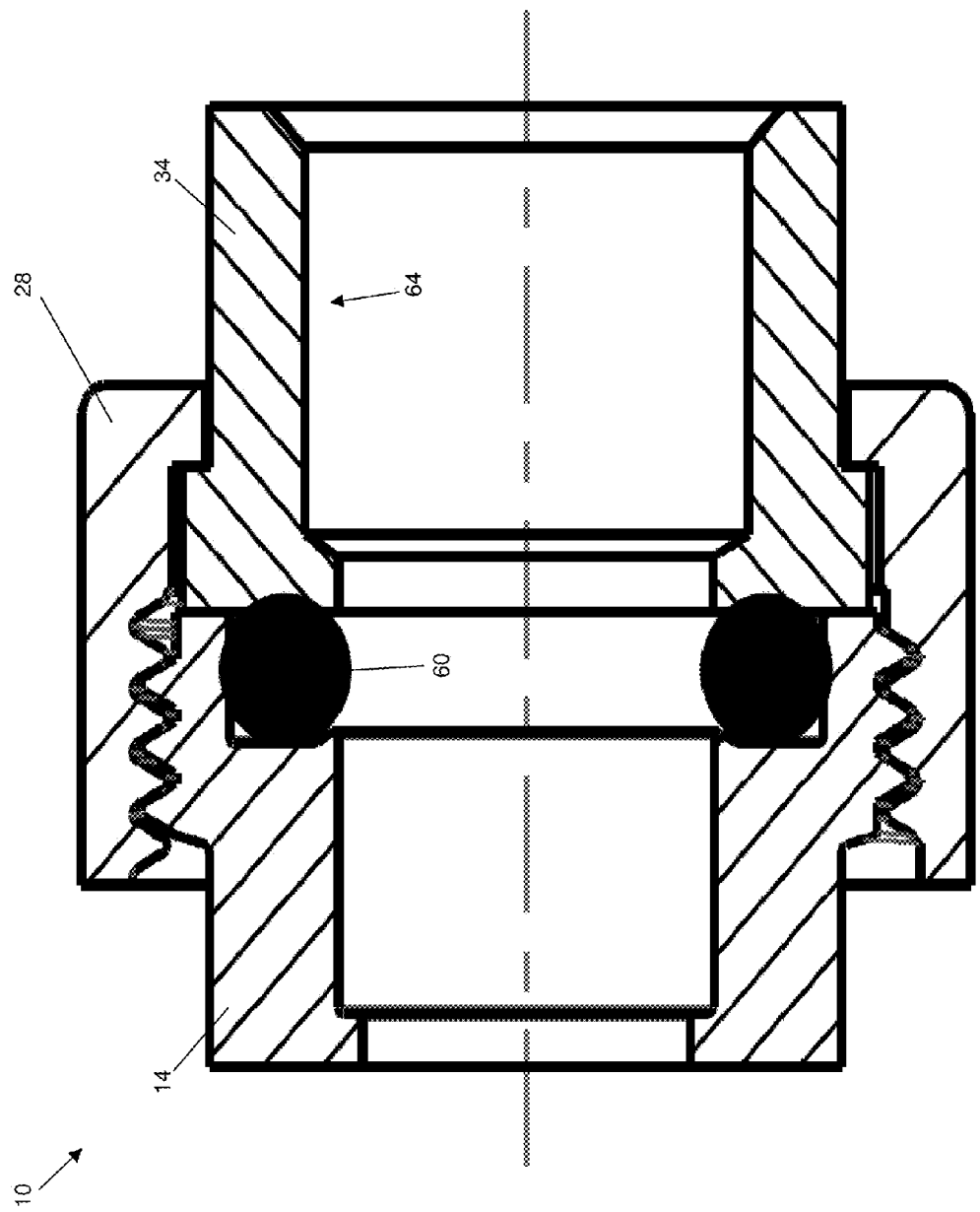
FIG. 7 illustrates a particular embodiment of still another valve connection utilizing certain aspects of the present inventions.

FIG. 7 illustrates still another possible configuration. The valve body 12 and port 14 are preferably identical to those described above. Select components of a collar group of this configuration may be interchangeable and/or identical to corresponding components of the collar group described above. For example, the collar 28 may be identical to those described above. This embodiment, or configuration, however may not utilize the washer 40 and/or spacer 50. Instead, the sleeve 34 may include a smooth interior surface 64 to which the tubing may be chemically and/or mechanically bonded, such as through the use of adhesives or solder. The o-ring 60 may provide a seal between the port 14 and the sleeve 34.

Figure 8:
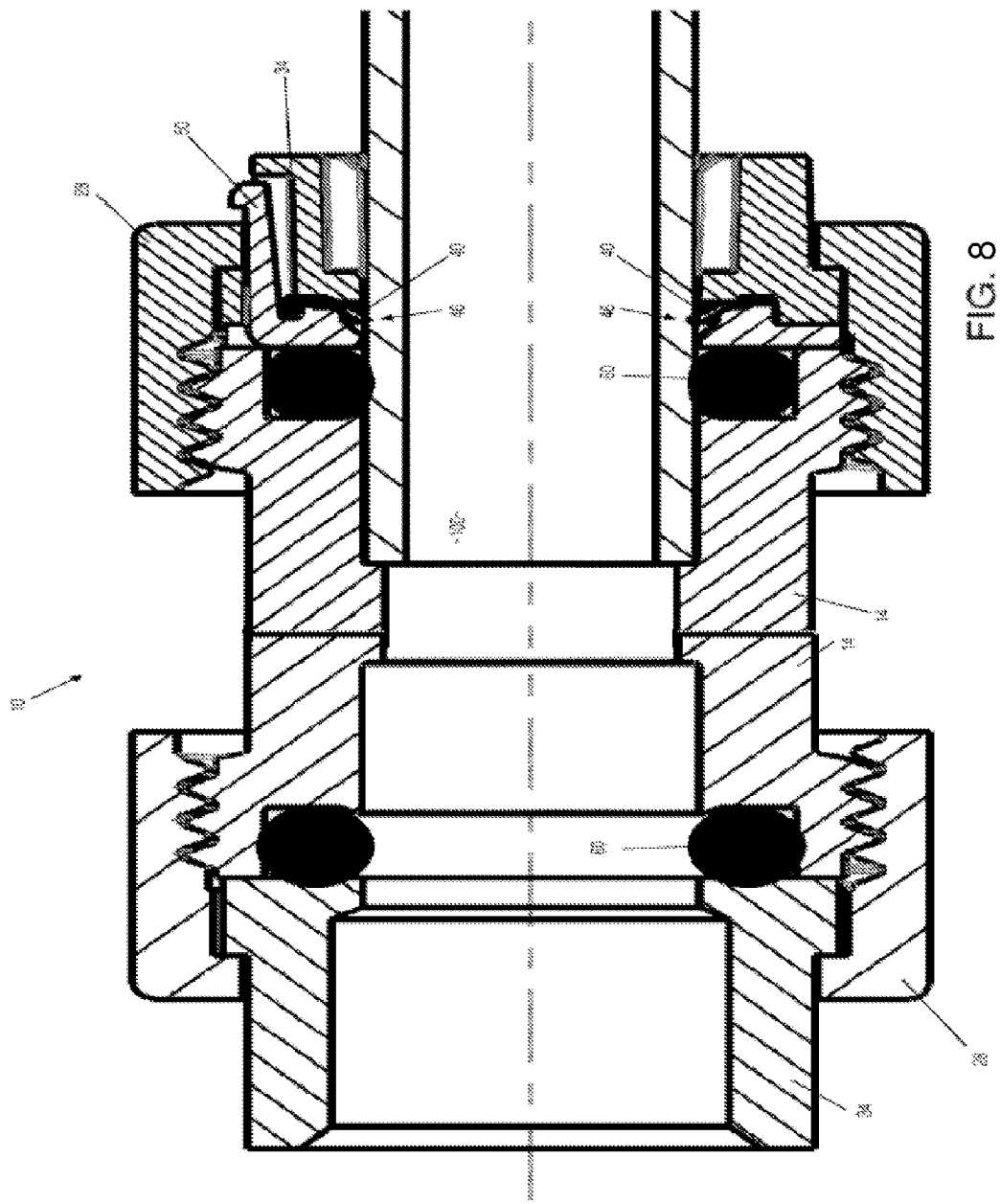
FIG. 8 illustrates a particular embodiment of yet another valve connection utilizing certain aspects of the present inventions.

In this manner, the valve assembly 10 may simplify the logistics otherwise required to make such connections for pneumatic and/or hydraulic flow control valves, especially where different types of tubing may be utilized (see, e.q., FIG. 8). More specifically, the present invention allows virtually any type of tubing to be connected to any of the ports 14 of the valve body 12, through the selective use of interchangeable collar groups and/or other components of the valve assembly 10. For example, as described above, hard threaded tubing, such as pipe, may be connected to the port 14 through the use of the collar group components shown and described with reference to FIG. 6. Alternatively, PVC, copper, or other tubing that is traditionally bonded may be connected to the very same port 14 through the use of the collar group components shown and described with reference to FIG. 7. Finally, plastic, brass, or other relatively soft tubing may be connected to the very same port 14 through the use of the collar group components shown and described with reference to FIGS. 1-5.

Other and further embodiments utilizing one or more aspects of the inventions described above can be devised without departing from the spirit of Applicant's invention. Further, the various methods and embodiments of the present invention can be included in combination with each other (see, e.q., FIG. 8) to produce variations of the disclosed methods and embodiments. For example, threaded tubing, tubing that is traditionally bonded, and/or relatively soft tubing may be connected to the same valve body 12, and any port 14 thereof, through the selective use the disclosed embodiments of the present invention. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A valve assembly comprising:
   a valve body;
   a first port configured to receive tubing and a second port identical to the first port;
   a first collar group including a washer having a planar outer area and an initially conical inner area with inwardly projecting teeth and configured to secure a first tubing to the first port by flattening the washer with a first sleeve, thereby driving teeth of the washer into the first tubing, and the first collar group having a gasket to seal around an outer surface of the tubing, the gasket having an inner diameter initially larger than an outer diameter of the tubing, the first collar group having a first collar threadably adjustable on the first port and being configured to reduce the inner diameter of the gasket onto the first tubing after the first tubing is inserted through the washer and the gasket; and
   a second collar group including a second collar identical to the first collar and a second sleeve different from the first sleeve and configured to be bonded to a second tubing, wherein the second collar group is configured to be threaded onto the second port to secure the second sleeve to the second port.

2. The assembly of claim 1, wherein the inner area of the washer is flattened to be planar with the outer area when the first collar of the first collar group is threaded onto the first port.

3. The assembly of claim 1, wherein the gasket is an o-ring.

4. The assembly of claim 1, wherein the gasket is an o-ring disposed between the first port and the first tubing.

5. The assembly of claim 4, wherein the o-ring has an oval cross section and is configured to shrink its internal diameter as the first collar group is threaded onto the first port.

6. The assembly of claim 1, wherein the first sleeve is disposed between the first collar and the first port and is configured to directly contact the washer to drive the teeth of the washer into the first tubing as the first collar is threaded onto the first port.

7. The assembly of claim 6, further including a spacer between the washer and the first port, wherein the spacer compresses the washer against the first sleeve as the first collar is threaded onto the first port.

8. The assembly of claim 1, wherein the washer is configured to not touch the first tubing as the first tubing is inserted into the first collar group.

9. The assembly of claim 8, wherein the washer is resilient such that the teeth expand away from the first tubing as the first collar group is threaded off the first port, thereby allowing the first tubing to be removed from the first collar group.

10. A valve assembly comprising:
    a valve body;
    at least one port configured to receive tubing;
    a first collar group configured to secure the tubing to the port by flattening a washer, thereby driving teeth of the washer into the tubing, and the first collar group having a gasket to seal around an outer surface of the tubing, the gasket having an inner diameter initially larger than an outer diameter of the tubing, the first collar group being threadably adjustable on the port and configured to reduce the inner diameter of the gasket onto the tubing after the tubing is inserted through the washer and the gasket; and
    a second collar group having a smooth interior surface configured to be bonded to the tubing, the second collar group being interchangeable with the first collar group and having threads configured to fit the same port as the first collar group.

11. A valve assembly comprising:
    a valve body;
    at least one port configured to receive tubing; and
    a first collar group including a washer and configured to secure the tubing to the port by flattening the washer thereby driving teeth of the washer into the tubing, and the first collar group having a gasket to seal around an outer surface of the tubing, the gasket having an inner diameter initially larger than an outer diameter of the tubing, the first collar group being threadably adjustable on the port and configured to reduce the inner diameter of the gasket onto the tubing after the tubing is inserted through the washer and the gasket;
    wherein the first collar group further comprises
    a collar having threads configured to be attached to the port with an opening in the collar having an inside diameter and the collar having an inwardly facing projection on the collar distal from the threads and having a smaller inside diameter than the opening;

a sleeve slidably engaged with the collar, the sleeve having an outwardly facing projection in a first portion with an outside diameter smaller than the opening and larger than the inside diameter of the inwardly facing projection and having an outside diameter in a second portion that is smaller than the inside diameter of the inwardly facing projection; and a spacer having an inside diameter larger than an outside diameter of the tubing and having an outside diameter smaller than the inside diameter of the opening and disposed between the washer and the gasket;

the collar configured to be threaded onto the port and pull the sleeve toward the port to compress the washer and the gasket with the spacer between the washer and the gasket.

12. The assembly of claim 11, wherein the spacer comprises a tab having one or more flanges configured to engage the inwardly facing projection of the collar.

* * * * *